(12) United States Patent
Besore et al.

(10) Patent No.: US 8,606,419 B2
(45) Date of Patent: Dec. 10, 2013

(54) SUBMETERING POWER CONSUMPTION OF APPLIANCES

(75) Inventors: John K. Besore, Louisville, KY (US);
Timothy D. Worthington, Crestwood, KY (US); Michael F. Finch, Louisville, KY (US); Lucas B. Spicer, Louisville, KY (US); Jeff D. Drake, Louisville, KY (US); Henry Kobraei, Louisville, KY (US)

(73) Assignee: General Electric Company, Schenectady, NY (US)

( * ) Notice: Subject to any disclaimer, the term of this patent is extended or adjusted under 35 U.S.C. 154(b) by 290 days.

(21) Appl. No.: 12/781,191

(22) Filed: May 17, 2010

(65) Prior Publication Data

US 2011/0282504 A1 Nov. 17, 2011

(51) Int. Cl.
*G06F 19/00* (2011.01)

(52) U.S. Cl.
USPC .......................................... 700/291; 700/295

(58) Field of Classification Search
USPC ......... 700/9, 11, 12, 14, 16, 19, 20, 275, 276, 700/286, 291, 295, 296
See application file for complete search history.

(56) References Cited

U.S. PATENT DOCUMENTS

| | | | |
|---|---|---|---|
| 4,575,801 A | 3/1986 | Hoberman | |
| 4,924,404 A | 5/1990 | Reinke, Jr. | |
| 5,801,940 A * | 9/1998 | Russ et al. | 700/9 |
| 6,633,823 B2 * | 10/2003 | Bartone et al. | 702/57 |
| 7,010,363 B2 * | 3/2006 | Donnelly et al. | 700/19 |
| 7,135,956 B2 * | 11/2006 | Bartone et al. | 700/295 |
| 7,177,728 B2 * | 2/2007 | Gardner | 700/295 |
| 7,181,293 B2 * | 2/2007 | Rothman et al. | 700/295 |
| 7,542,824 B2 * | 6/2009 | Miki et al. | 700/291 |
| 7,752,856 B2 * | 7/2010 | Senba et al. | 700/276 |
| 2002/0103655 A1 * | 8/2002 | Boies et al. | 705/1 |
| 2004/0117330 A1 * | 6/2004 | Ehlers et al. | 705/412 |
| 2006/0095164 A1 * | 5/2006 | Donnelly et al. | 700/295 |
| 2007/0021874 A1 | 1/2007 | Rognli et al. | |
| 2008/0236177 A1 * | 10/2008 | Senba et al. | 700/275 |
| 2008/0306632 A1 * | 12/2008 | Miki et al. | 700/276 |
| 2011/0153100 A1 | 6/2011 | Besore | |

FOREIGN PATENT DOCUMENTS

| | | |
|---|---|---|
| WO | 2006/049356 A1 | 5/2006 |
| WO | 2009010892 A1 | 1/2009 |
| WO | 2010/031012 A1 | 3/2010 |

OTHER PUBLICATIONS

European Search Report issued in connection with EP Patent Application No. 11169702.5, Dec. 8, 2011.

* cited by examiner

*Primary Examiner* — Charles Kasenge
(74) *Attorney, Agent, or Firm* — Global Patent Operation; Marc A. Vivenzio

(57) ABSTRACT

A system and methods are provided for monitoring the power consumption of a particular energy consuming device of a plurality of energy consuming device devices and particular components thereof in real time. An energy management system can enable components of a device within a home network to power to different operational modes in order to determine different power consumption levels. The system can sort out anomalies and extract them from a power consumption profile created.

12 Claims, 7 Drawing Sheets

SUBMETERING POWER CONSUMPTION OF APPLIANCES

BACKGROUND

This disclosure relates to energy management, and more particularly to electrical device control methods and electrical energy consumption systems. The disclosure finds particular application to energy management of appliances, for example, dishwashers, clothes washers, dryers, HVAC systems, etc.

Many utilities are currently experiencing a shortage of electric generating capacity due to increasing consumer demand for electricity. Currently utilities generally charge a flat rate, but with increasing cost of fuel prices and high energy usage at certain parts of the day, utilities have to buy more energy to supply customers during peak demand. If peak demand can be lowered, then a potential huge cost savings can be achieved and the peak load that the utility has to accommodate is lessened. In order to reduce high peak power demand, many utilities have instituted time of use (TOU) metering and rates which include higher rates for energy usage during on-peak times and lower rates for energy usage during off-peak times. As a result, consumers are provided with an incentive to use electricity at off-peak times rather than on-peak times, and to reduce overall energy consumption of appliances at all times.

Presently, to take advantage of the lower cost of electricity during off-peak times, a user must manually operate power consuming devices during the off-peak times. However, a consumer may not always be present in the home to operate the devices during off-peak hours. In addition, the consumer may be required to manually track the current time to determine what hours are off-peak and on-peak.

Therefore, there is a need to provide a system that can automatically operate power consuming devices during off-peak hours in order to reduce consumer's electric bills and also to reduce the load on generating plants during on-peak hours. Active and real time communication of energy costs of appliances to the consumer will enable informed choices of operating the power consuming functions of the appliance.

To better inform the user about energy costs and usage there arises a need to get specific inputs from all devices within the home area network (HAN) regarding the amount of power each device is consuming on a real time basis. This disclosure provides a means of acquiring this data to be shared with the user as disclosed herein.

SUMMARY

More specifically, this disclosure provides a system that can determine the power consumption of a device without adding any additional hardware to the system beyond that which already exists, for example in demand response (DR) enabled appliances, a home energy management system (HEM) and/or a programmable communicating thermostat (PCT). For example, HVAC systems have variable power consumptions depending on many key variable parameters such as indoor temperature, outdoor temperature, cleanliness of the filter, refrigerant charge of the unit, elapsed time after the start of the cycle, cleanliness of the condenser, fan speed of the low & high side fans, voltage, etc. Since the HEM and possibly the PCT may determine the indoor temperature, outdoor temperature, cycle times, and the watts the unit is consuming in real time, a system is configured to develop a dynamic table of power consumption versus indoor & outdoor temperatures. By creating a "baseline matrix" one can continually compare readings on any given day, knowing the inside and outside temperatures to diagnose the HVAC system and offer up notifications and/or suggestions for remedying in cases where the power consumption is "out of line" relative to the historical matrix.

Likewise, the system would be able to offer notifications about the condition of the house relative to heat leakage by comparing HVAC or heating run times for equivalent weather conditions from historical stored data. The system may also be configured to "compare notes" with similar houses in a neighborhood, for example, to provide insights into energy savings tips, such as adding insulation, better windows, etc. The system may be coupled to a user display device and/or interface that can enable the user to input some basic data about the house size, age, window construction, etc. Appliance specific cost information will be available to the user through this system. Instead of the general statements like, "raising the thermostat 2 degrees saves an average of 5% during cooling months" this system can give accurate information on historical costs and can predict saving based on suggested changes to the HEM or PCT profiles.

DETAILED DESCRIPTION

Demand response (DR) appliances are configured to respond to incoming signals from utilities (e.g., for a load shedding event), and/or user inputs for modifying the operation of the appliance (e.g., for energy savings). Coupled with DR appliances a home energy manager (HEM) provides feedback to a user regarding the performance of the appliances. For example, a user may be able to monitor and/or modify the appliances' responses as well as get real time feedback on power consumption. Rather than relying upon current transducers, lookup tables, and/or shunts to determine the power consumption of a particular appliance, power consumption of individual appliances may be profiled in one embodiment through a smart communication system which systematically cycles appliances and their components while reading the power meter.

Figure 1:
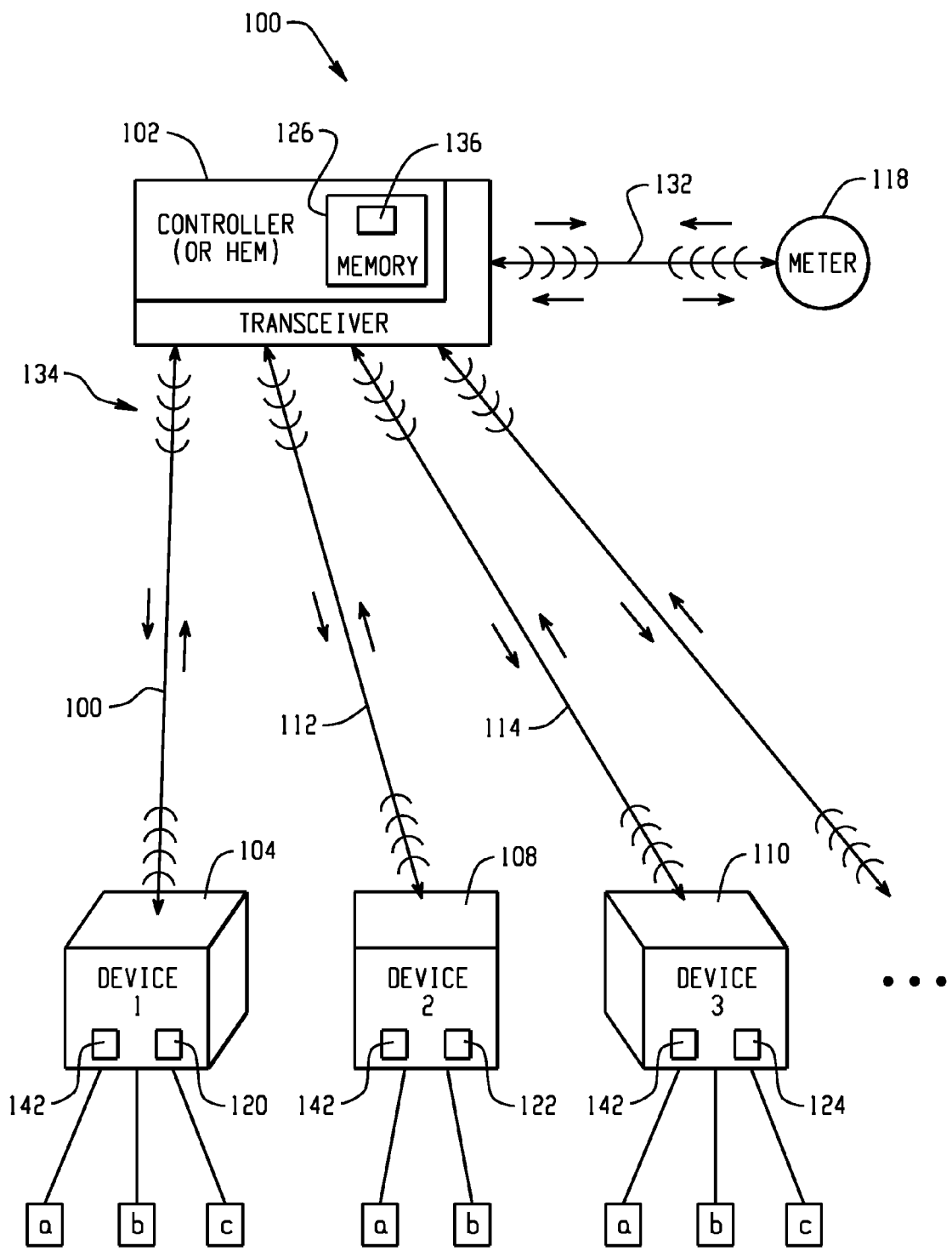
FIG. 1 is a schematic illustration of an energy management system.

FIG. 1 illustrates a schematic of an energy management system 100 (e.g., a home management system) operative to monitor and modify the operation of a plurality of power consuming appliances and/or other devices. For example, the power consumption of the appliances in a home can be monitored and the operation of the appliances can be selectively modified to manage power consumption to facilitate load shedding, energy savings, and other potential benefits for the consumer and for the utility provider. The system 100 comprises a controller 102 operative to communicate with the appliances and other devices in the system and with the utility provider. For example, the controller 102 can be a home energy manager (HEM) for use with a smart grid and smart appliances that are configured to receive and respond to commands provided by a user or a utility manager.

In FIG. 1, a plurality of appliances or other energy consuming devices are illustratively represented by devices 104, 108 and 110. Device 104 is coupled to the controller 102 by a communication link 106. Link 106 is a two way communication link that can be any means of coupling the controller 102 with the device 104. For example, link 106 can be a wireless communication link (e.g, a zigbee communication format, RF, PLC, wifi, or any other communication protocol transmitted therebetween). Link 106 can be any wired communication link or cable (e.g., physical hard wiring, fiber optic, etc.) operable to direct communication signals to and from the device 104.

Devices 104, 108 and 110 can be any power consuming or power controlling devices within a home, for example, an appliance, a thermostat, a pool pump, a load switch, a light, a water heater, etc. The appliances may be one or more of an HVAC, a refrigerator, a dishwasher, a dryer or any appliance configured to operate at power levels detectable by the power meter. In FIG. 1, device 108 and device 110, are coupled to the controller 102 via communication links 112, and 114 respectively for communicating instructional information in a manner similar to device 104. While three devices are shown in FIG. 1, any number of devices may be coupled to the controller 102.

The respective devices may each comprise components that are configured to perform various functions within each device, which may have various components therein. For example, the device 104 may comprise components a, b and c, the device 108 may comprise components a and b, device 110 may comprise components a, b, and c as illustrated in FIG. 1. However, any number of devices with a different numbers of various components therein may be envisioned. Although the components a, b, and c are labeled similarly for the respective devices, the components of each device may be different. For example, device 104 may be a refrigerator, and component a of device 104 may be a refrigerator compressor, component b may be a evaporator fan and component c may be a defrost heater, while device 108 may be a HVAC unit and component a of device 108 may be a fan and component b may be a compressor. Other examples of components include an anti-sweat heater, or a vegetable environment control in a smart refrigerator, or any component of a device that can be appreciated by one of ordinary skill in the art as consuming power separately from other components within the device.

Furthermore, the respective devices 104, 108, and 110 of the system 100 can each comprise a microcontroller for enabling each device to respond to commands from or provide commands to the various components comprising the device. The microcontroller of the device can be configured to receive command instructions for processing, such as commands to modify the operation of the device, for example, to power up individual components, or power down individual components to various power consumption levels to implement one or more operating modes.

The controller 102 is configured to transmit and/or receive signals, and comprises a memory 126 for storing instructions received or transmitted. Controller 102 is coupled via the links 106, 112, and 114 to devices 104, 108 and 110 respectively of system 100, and to a power meter 118 via a link 132, for example. The links mentioned may be communication links and are not limited to any particular type of communication format.

The power meter 118 can comprise a smart power meter having a microcontroller therein for providing and processing instructions. For example, the meter may convey information to a user for maintenance, modification of the load thereat, or for reading a power consumption of a home or other enclosure with appliances. A user may be any user, such as a consumer of power in a home, a meter reader of a utility company.

The energy management system may also comprise a user display device (not shown) that may be coupled to each individual appliance respectively or to the overall system 100 that configures data received and presents information to the user about energy savings, tips for saving money, maintenance tips, etc. In addition, the user display may be a GUI display or otherwise that enables a user to input modification information that instructs the controller to modify the operation of the devices/appliances in the system. By such an arrangement a user can opt to participate in various energy saving programs or not.

A communication 134 (e.g., a two way communication, or a one way communication) via the links 106, 112, or 114 can comprise instructions (e.g., programmable instructions, or software code) configured to trigger an event within respective appliances for monitoring or controlling power consumption therein. For example, communication 134 can be operative to command the appliance 104 on or off in addition to receiving information (e.g., whether the device is on, partially on or off) from a respective device, such as the device 104. In addition, the controller 102 may receive information via communication 132 from the power meter 118 related to power consumption.

The controller 102 may be configured to send the communication 134 to the appliance via the communication links in order to command an appliance microprocessor 120, 122, and/or 124 to power the device off, on, and/or partially off and on while the controller receives power consumption information from the power meter 118 and stores such information into its memory 126. Because the controller 102 is configured to command any particular device on and off, and to varying degrees depending on the number of components in the device, a power difference can be determined by receiving a power consumption reading when the device is commanded on by the microcontroller 120, 122, and/or 124 of the respective appliance in response to a signal from the controller and then again when the device is commanded off by the micro 120, 122, and/or 124 of the appliance in response to the communication signal 134 from the controller 102. These readings can be actual power readings at the power meter in real-time when requested at the specific time by the controller.

The memory 126 can comprise a dynamic table therein with dynamic variables. The dynamic table can be configured to determine a power consumption profile of a device or appliance based on information received from the meter and updated in the memory. The dynamic variables used to determine the power consumption profile can comprise real time power consumption readings and one or more of the following parameters, indoor temperature, outdoor temperature, elapsed time after the start of an operating cycle, a time of day.

Some devices or appliances, such as HVAC systems, can have variable power consumptions depending on different environmental or operating conditions. Parameters indicative of such conditions, such as indoor temperature, outdoor temperature, cleanliness of the filter, refrigerant charge of the unit, elapsed time after the start of the cycle, cleanliness of the condenser, fan speed of the low & high side fans, voltage, etc. may be measured by appropriate sensors and stored and dynamically updated in the dynamic table 136 of the memory 126. Because the controller 102 (e.g., an HEM and/or a PCT coupled thereto) can be configure to sample the indoor temperature, outdoor temperature, cycle times, and the watts the unit is consuming in real time, the controller can configure the system to develop a table of power consumption versus indoor & outdoor temperatures, for example. By creating a "baseline matrix" a user can continually compare readings on any given day, knowing the inside and outside temperatures to diagnose the HVAC system and offer up warnings and/or suggestions for remedying in cases where the power consumption is "out of line" relative to the historical matrix. Likewise, the system 100 can be configured to offer notifications about the condition of the house relative to heat leakage by comparing HVAC or heating run times for equivalent weather conditions from historical stored data.

Another embodiment, could configure the system to "compare notes" with similar houses in a particular neighborhood to provide insights into energy savings tips such as adding insulation, better windows, etc., in which the user will input some basic data about the house size, age, window construction, etc. For example, a utility provider can aggregate data of homes within a certain area in order to determine a statistical analysis of energy consumption for an individual home. The home energy management system first communicates to an HVAC unit of an individual home, for example, and obtains power consumption data regarding the unit efficiency. This data is then communicated to the utility provider, which filters the information for comparison to similar homes. Statistical comparisons of energy consumption in turn are sent to the home energy system of the individual homes in order for consumers to receive tips or data related to how their home energy consumption can be more efficient for saving money as compared to other similar homes in their neighborhood. For example, an average of the energy consumption of home HVAC units of similar homes in the neighborhood could be reported to the consumer by the utility provider. Appliance specific cost information will be available to the user through this system. Instead of the general statements like, "raising the thermostat 2 degrees saves an average of 5% during cooling months" this system can give accurate information on historical costs and can predict saving based on suggested changes to the HEM or PCT profiles.

When a device such as a PCT (programmable communicating thermostat) is employed within a home appliance network (HAN) and one is trying to gain an insight into the power consumption of an appliance, such as a HVAC, the device (HVAC or other) can be commanded "on" & "off" by the HEM (or turn itself on/off) systematically while obtaining power consumption data from the meter to arrive at the overall consumption of the device. In one aspect of the disclosure, communications with a power meter (e.g., a power/energy measuring device 118) can be conducted by the device or the HEM.

The HEM can know ahead of time when the HVAC will be instructed or commanded to turn on. For example, the HEM can reference the previous two cycles, and evaluate the "total off time" between these cycles to arrive at an estimated start time for the next cycle. This would be accomplished by adding the "total off time" to the end time of the last cycle to estimate the start of the next cycle. Alternatively, the thermostat can be linked to the HEM, or possibly built-in to the HEM and can provide estimates of the future start of the next cycle by estimating the rise time of the room. This would be accomplished by looking at previous cycles to develop a curve of temperature versus time during the off cycle of the HVAC. By curve-fitting this data, the HEM could estimate the start time for the next cycle.

In one embodiment, the HEM can take a baseline power meter reading prior to the energy consuming device cycling on and then communicate a command to record a power level reading after a start of the cycle (e.g., approximately 30 seconds after the start). This may allow enough time for any extreme power spikes due to initial pressure pulldown to occur. However, wattage draw of a component of the unit (e.g., a compressor) can continually drop exponentially during the run cycle as the system pressures further stabilize and the ambient temperature more closely approaches a setpoint, which means less load on the HVAC system. Consequently, a single reading of the power meter does not necessarily provide the desired accuracy. In order to obtain a more accurate measure of the power consumption of the HVAC system power consumption data from the meter can be obtained with some prescribed frequency of measurements and the resulting data can be processed to obtain a better approximation of the average power draw of the HVAC. The present disclosure provides several embodiments of algorithms which can be used to process the data to approximate the average power draw of the HVAC system. These algorithms can further comprise identifying outliers beyond standard deviation limits and extracting those points when determining the profile.

In one embodiment, the outliers can be determined or identified by developing a chart of running averages and standard deviations either side of a mean value of the first and second power levels for the energy consuming device as a function of time and based on parameters comprising indoor temperature, outdoor temperature, a period of time after the start of an operating cycle, a time of day, sunny versus overcast amounts, previous cycle lengths and/or power consumption in real time.

Figure 2:
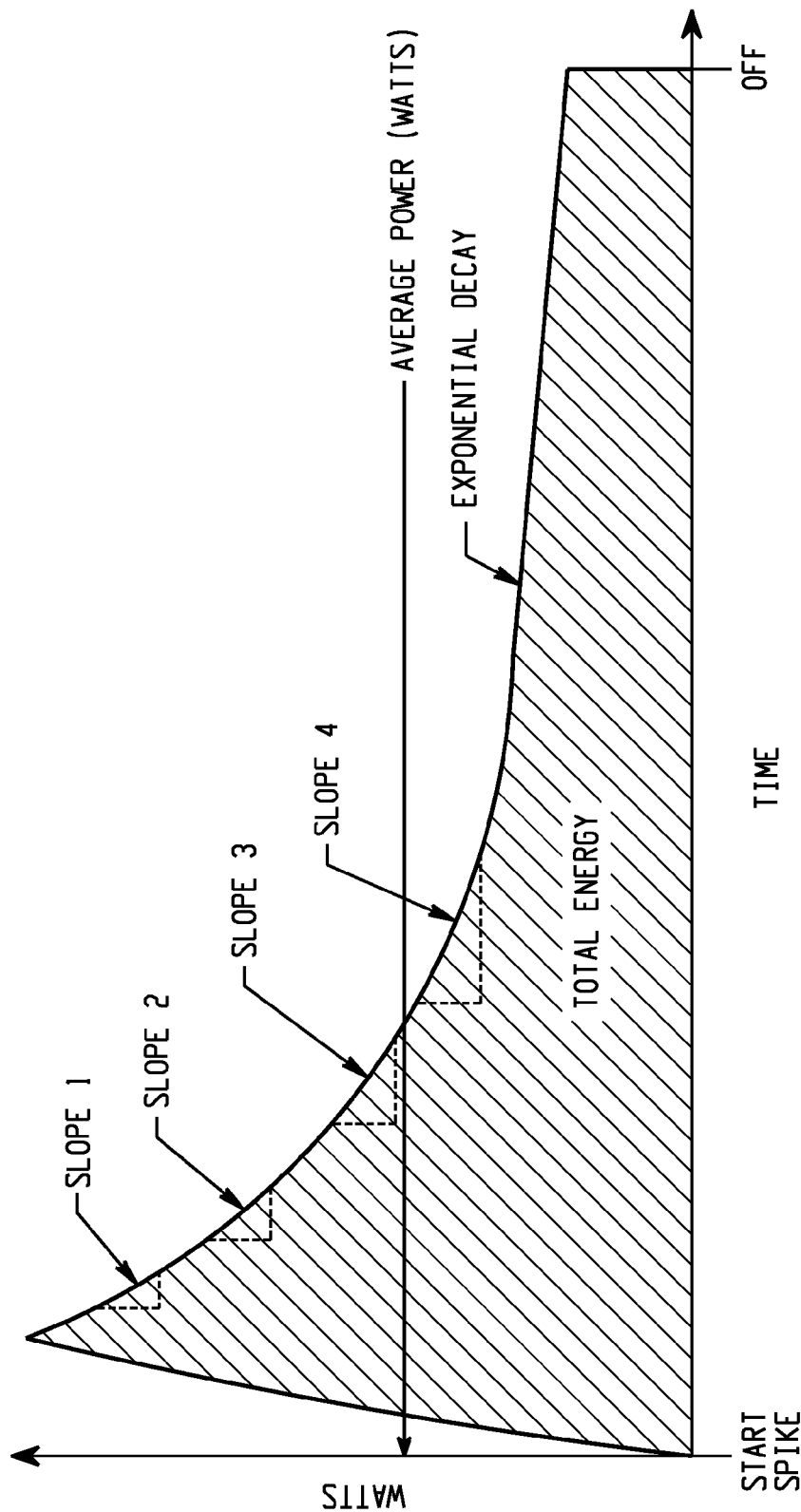
FIG. 2 is a diagram of one aspect of the present disclosure.

FIG. 2 illustrates one embodiment for determining an energy/power consumption profile of an energy consuming device and/or a particular component of the energy consuming device of a plurality of energy consuming devices (e.g., an appliance/HVAC unit, etc.) within a home network. For example, an energy management system can look at the delta power (e.g., a power consumption difference of two or more power consumption levels) consumed in a given timeframe and then settle on the power when a specified targeted change is experienced in the timeframe (i.e., the power has reached some targeted asymptotic condition or slope). For example, slope 1, slope 2, slope 3 and/or slope 4 may be determined by differences in power levels in watts versus a time interval. The power level coinciding with the specified targeted change or slope (e.g., slope 4) can then be designated as the average power. This power can then be recorded and/or reported as the average power consumption for the device and/or a component of the device in order to approximate nearly an integrated average power consumption. In order to determine the "targeted slope" that will best approximate the "true average", the system will apply the scheme described in paragraph 35 below to determine the true average of the watt-time curve. Then, knowing this "true average" power, the system can calculate the slope of the watt-time curve at the point of the curve which has the value corresponding to the true average power and use that slope as the "target slope" for subsequent average power measurements. This process is similar to acquiring the approximate time to "read" the watts to coincide with the "true average" power as described with reference to the embodiment of FIG. 4.

Figure 3:
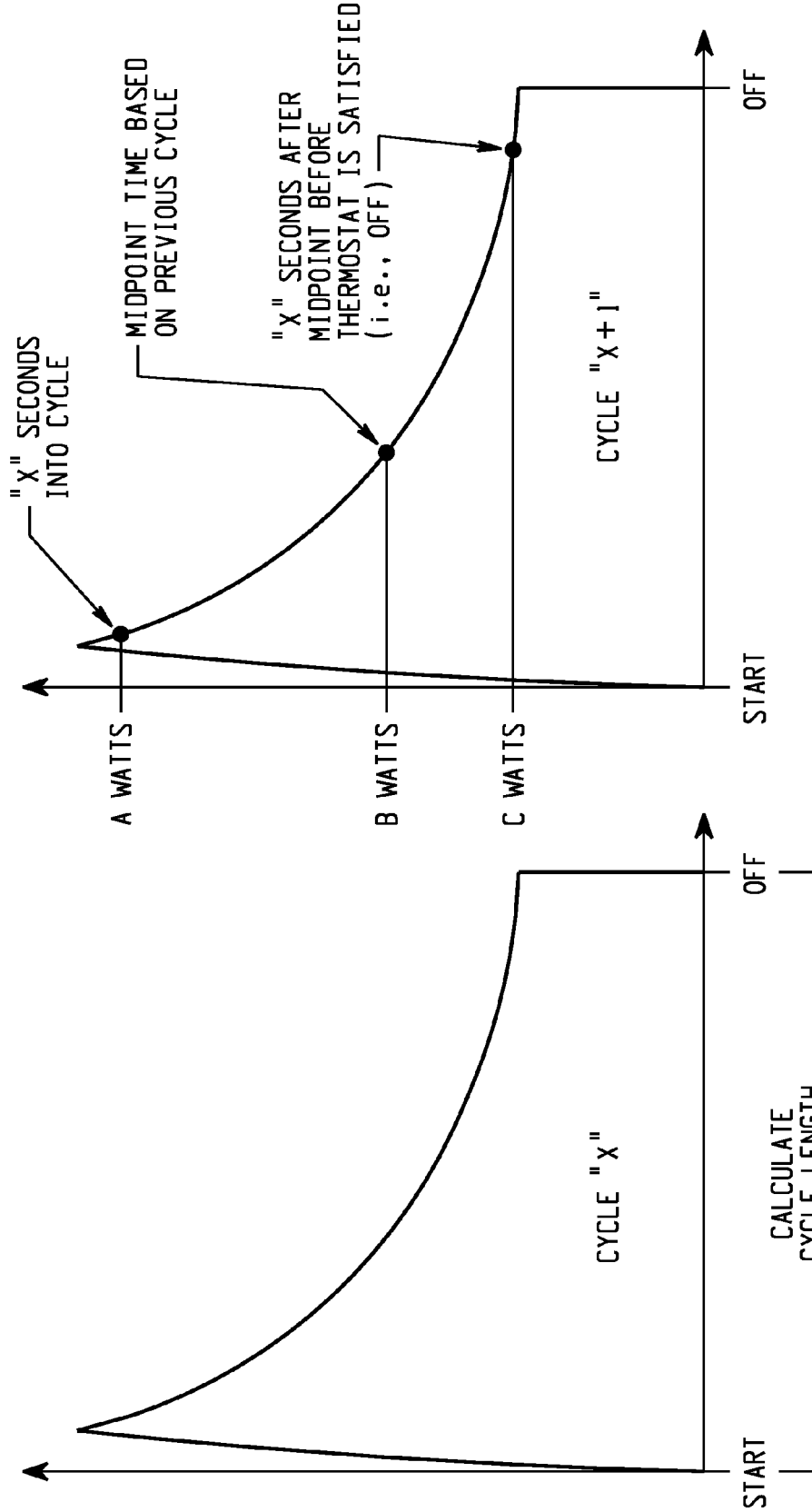
FIG. 3 is a diagram of one aspect of the present disclosure.

FIG. 3 illustrates another embodiment for determining an energy/power consumption profile of an energy consuming device and/or a particular component of the energy consuming device of a plurality of energy consuming devices within a home network. The HEM system can determine the length of the previous cycle (e.g., a first or initial cycle) and assume that the current cycle (e.g., a second cycle) will be similar and then obtain power consumption data points at multiple specific points of time within the cycle e.g., 30 seconds into the current cycle, midpoint of the current cycle (based on the previous cycle length) and a point of time after the midpoint time e.g., 30 seconds before cycle is finished, using an estimated end point, which may be determined based on ramp rates of temperature vs. time or based on the duration of the previous power on cycle. The system could then average these three wattage readings to reach an average power consumption for the cycle. This process can be repeated for each subsequent cycle to develop a running, dynamic map of average power consumption. In addition, the same three points that were acquired can be curve fit to acquire an equation of watts versus time. Then, one would integrate the curve over the timeframe and divide by the elapsed time to acquire the "true average" power.

Figure 4:
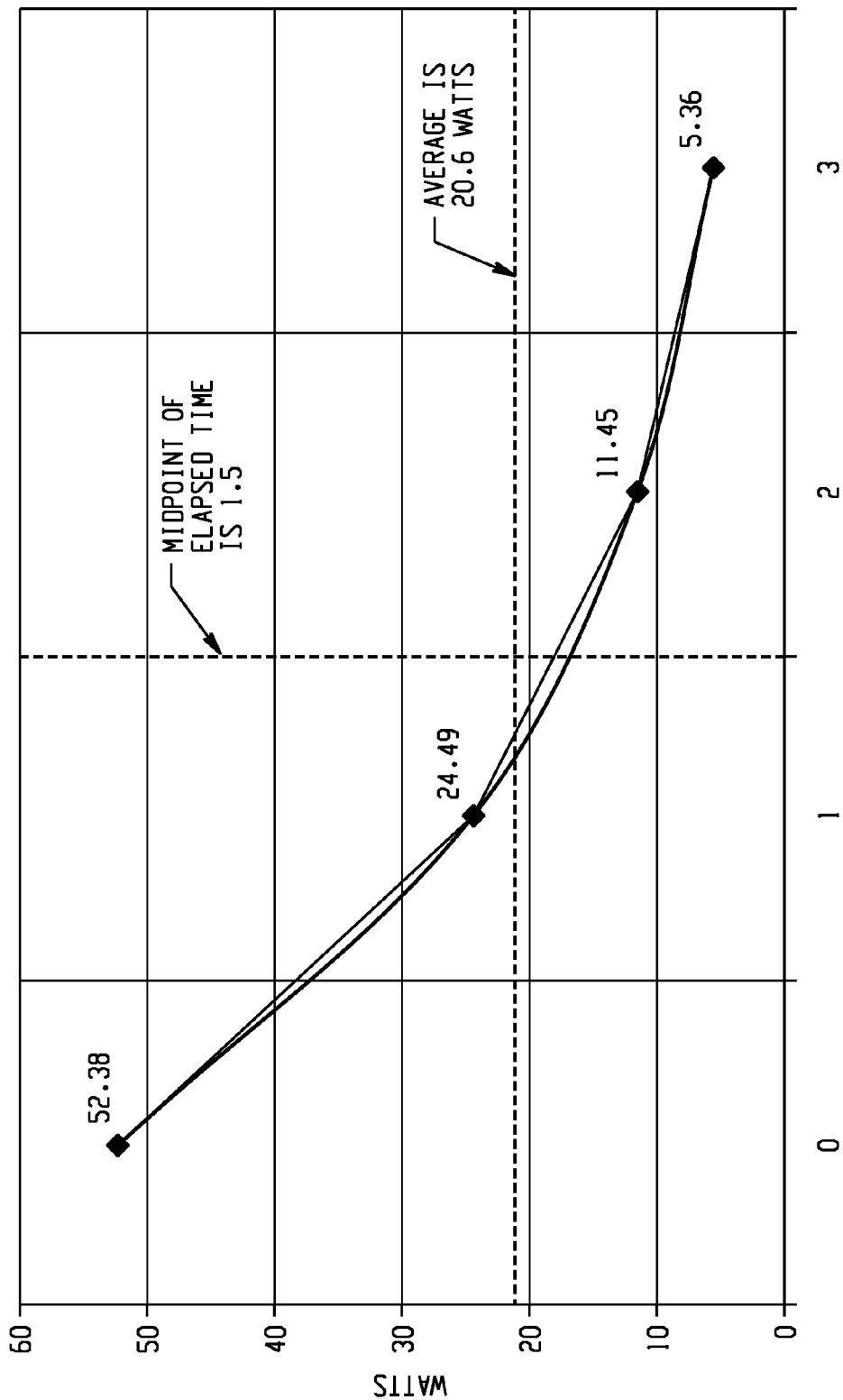
FIG. 4 is a diagram of one aspect of the present disclosure.

By knowing the "true average" power, which is determined as described above, the system can record the exact time where the "true average" power occurs. In the example of FIG. 4, the "true average" power has been determined to be 20.6 watts by one of the above described techniques, which occurs at 1.2 on the time axis. Then, the system would calculate the ratio of the time where the "true average" occurs (1.2) versus the midpoint time (1.5) of the cycle. In FIG. 4, this ratio would be 1.2/1.5=80%. Then, in subsequent cycles, the system would simply acquire the instantaneous power consumption at a time coinciding with 80% of the projected midpoint time to obtain an accurate approximation of the "true average". This simplifies the process of obtaining an approximation of the "true average" by requiring only one power level measurement at a specific time.

Figure 5:
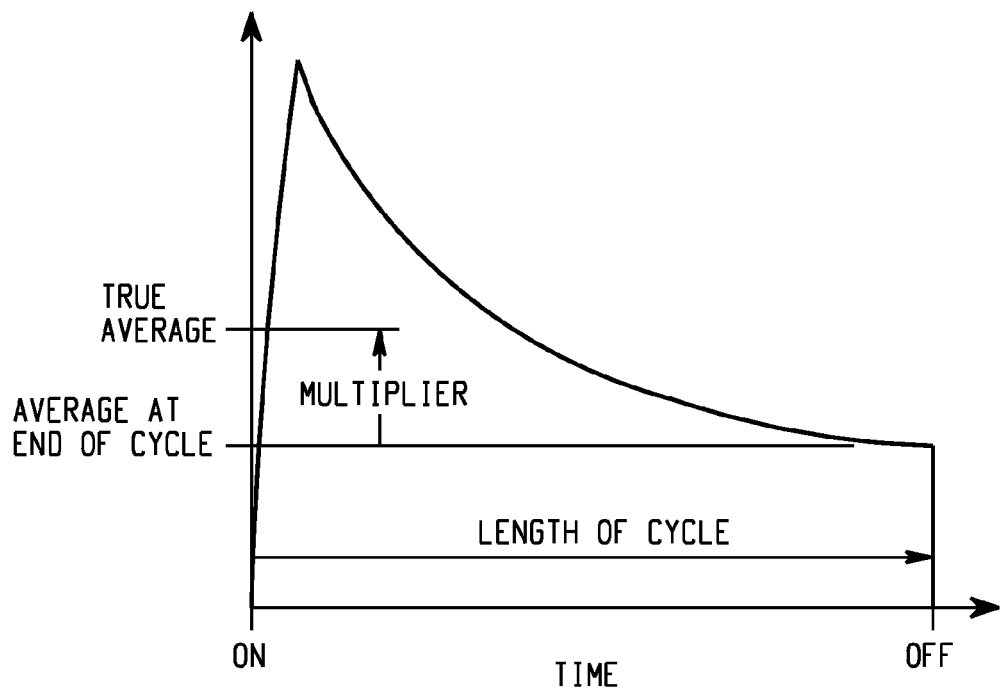
FIG. 5 is a diagram of one aspect of the present disclosure.

FIG. 5 illustrates another embodiment for determining an energy/power consumption profile of an energy consuming device and/or a particular component of the energy consuming device of a plurality of energy consuming devices within a home network. In this embodiment, the system obtains arcading of the meter just before and just after an off cycle to obtain the power consumption of the device. For example, a multiplier can be determined for an exponential delay that can give a representative estimate of a true average (e.g., multiplier*power at end of cycle). Similar to the case above, this algorithm takes the power level at the end of the cycle (as the level here is the most stable and has approached the lowest slope) and then relates this power to the true average achieved by the method described above with regard to FIG. 4. In this case, the ratio of the true average to the ending power consumption is calculated. This ratio will be greater than one since the true average will be greater than the ending power consumption. Then, the power consumption can be read at the end of the cycle and multiplied by the multiplier to estimate the average power. This makes it easier to acquire the average power consumption. Of course, this process assumes that the subsequent cycles are shaped similar to the cycle whereby the ratio or multiplier was calculated. One would want to recalibrate this ratio with some specified frequency to account for a change in the shape of the curve. The curve shape will be influenced by all of the variables outlined earlier in this disclosure. A recalibration might need to be done every week or so, which also applies to the prior embodiment where the ratio of time is calculated to read the average power.

Figure 6:
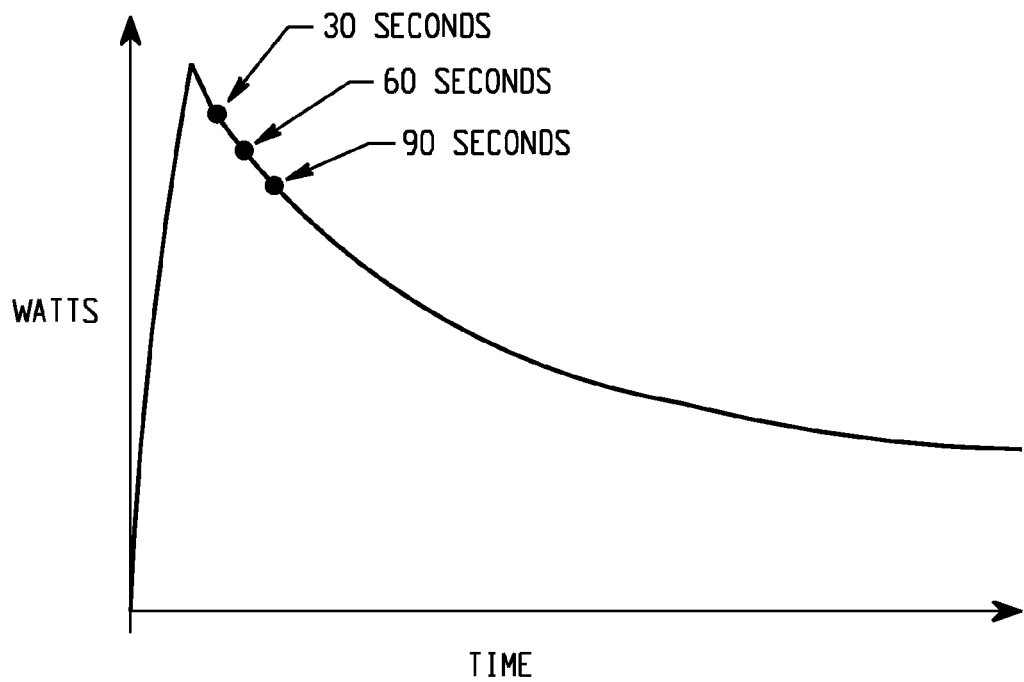
FIG. 6 is a diagram of one aspect of the present disclosure.

FIG. 6 illustrates another embodiment for determining an energy/power consumption profile of an energy consuming device and/or a particular component of the energy consuming device of a plurality of energy consuming devices within a home network. The system can curvefit an exponential curve using data points measured early in the cycle, and then integrate the area under that curve divided by the elapsed time to ascertain an average integrated power consumption for that timeframe. For example, the system could acquire power consumption data from the meter two or more times in quick succession (say 30, 60, and 90 seconds into the run cycle) and then curvefit these points to acquire the power curve vs. time. Then, the system would integrate the area under this "power consumption vs. time curve", estimate the cycle length or use the previous cycle length as a guide. As in the case earlier, the system would divide the integrated energy (watt-hrs) by the cycle length to obtain the average power consumption during this timeframe.

Figure 7:
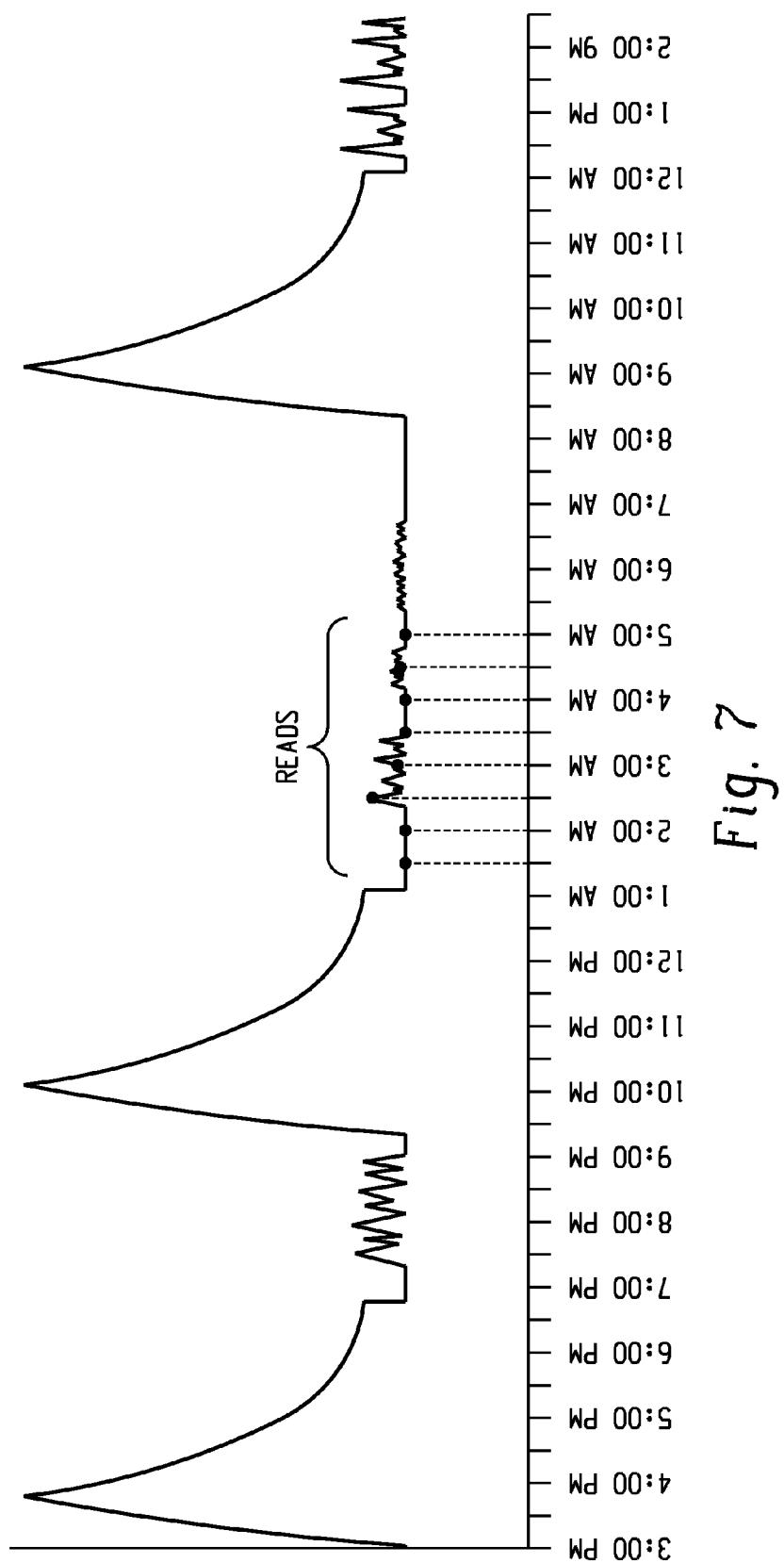
FIG. 7 is a diagram of one aspect of the present disclosure.

FIG. 7 illustrates a refinement applicable to the above illustrative embodiments for determining an energy/power consumption profile of an energy consuming device and/or a particular component of the energy consuming device of a plurality of energy consuming devices within a home network. Considering other devices in the home are on when reading the power levels of the appliances, a way to subtract the "baseline power consumption" of the home from the average power we get for each appliance from the algorithms noted herein is desired. For example, if the home has numerous power supplies, routers, chargers, night-lights, etc. that are always on, these loads are additive to the power that the meter is reading. Thus, a good reading of the consistent base loading is desired. For example, the energy management system can begin reading a power meter every "x" minutes starting at a time (e.g., 2:00 AM) when very little extraneous loading will likely be present. It can then re-read the meter for several iterations during the next several hours to establish a baseline load. Then, knowing when the HVAC will cycle on, the unit or system can start reading the load as described above and compare to the baseline achieved during the 2:00 AM hour forward to get the power consumption delta or difference. In other words, one could then subtract the baseline from the average power we acquire from the algorithms noted herein. Likewise, a dynamic chart described in other areas of this disclosure can be used to sort out other anomalies whereby stray power consuming devices that confound the data can be noticed and that data point thrown out of any calculation.

In HVAC systems that incorporate other power "users" such as humidifiers, strip heaters (Heat pump), dehumidifiers, etc, a similar system of obtaining power consumption data from the meter during the on/off cycles to extract the power consumption delta between those two states can be performed as well.

Figure 8:
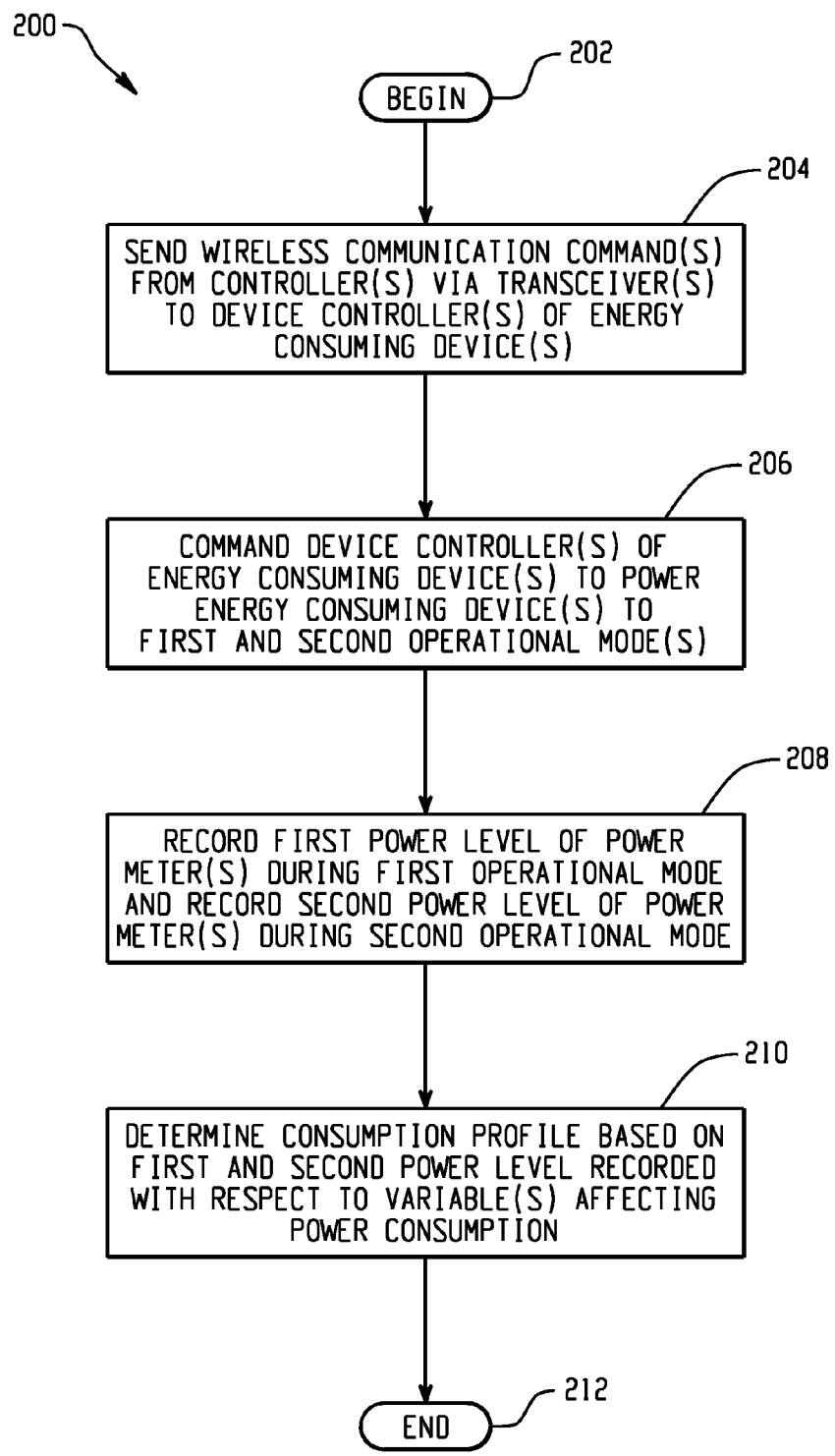
FIG. 8 is a flow diagram illustrating an example methodology for implementing an energy management system with a plurality of energy consuming devices having different components.

An example methodology 200 for implementing the energy management system of FIG. 1 is illustrated in FIG. 8. While the method 200 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

The method 200 monitors power consumption of the energy consuming devices in the home network, which devices, e.g., devices 104, 108 and 110 of FIG. 1, may each have a plurality of energy consuming components. The network includes an energy management system and a power/energy measure device (e.g., a power meter) for measuring total power consumed by the devices. The method can be executed via a controller e.g., 102 of FIG. 1 with a memory for storing instruction to execute the method.

Referring to FIGS. 8 and 1, the method initializes at 202. At 204, communication commands are be sent to one or more device controllers e.g., 120, 122 and 124 of the devices 104, 108 and 110 via controller 102 (e.g., wireless RF commands, and/or any other communication link).

To obtain power consumption information for device 104 for example, at 206 a first communication command sent commands the device controller 120 to power the device 104 to a first operational mode. A second different communication command, commands the device controller 120 of the device 104 to power to a second different operational mode. The first and second operational modes can comprise at least one component of the energy consuming device powered on while maintaining at least one different component of the device off. In one embodiment, the first operational mode can comprise a different power consumption than the second operational mode. For example, the first operational mode can comprise a greater/lesser power consumption level than the second different operational mode. The first operational mode may be a compressor and evaporator fan both on mode and the second operational mode may be a compressor off evaporator fan on, mode.

At 208 the first power level can be recorded during the first operational mode of the device and a second power level of the device can be recorded during the second different operational mode. For example, the controller of the system can record a power consumption data from a power meter, which may be coupled to the controller wirelessly.

At 210 a consumption profile (e.g., a power/energy consumption profile) can be determined based on the first and second power level recorded with respect to variables that may affect power consumption at the measuring device or meter. At 212 the method finalizes.

In one embodiment, the variables can comprise, indoor temperature, outdoor temperature, elapsed time after the start of an operating cycle for the device, on/off cycle lengths and/or power consumption in real time.

In one embodiment, the first operation mode can comprise a complete powering of the device with all components powered on and the second operational mode can comprise a minimal power consumption of the device with all components of the device powered off except a master control board (e.g., a control interface, which may be external or internal to the device or a housing of the device).

In one embodiment, the device controller powers on the particular one component via a processor of the device controller and obtains the first and second power levels from the power/energy measuring device by a wireless radio frequency transmission.

In one embodiment, the energy consuming device can comprise a demand response appliance configured to manage power consumption by responding to communication commands from the device controller, and wherein the plurality of energy consuming devices comprises an HVAC, a refrigerator, a dishwasher, a dryer and any other power consuming device configured to operate at power levels detected by the power/energy measuring device.

In one embodiment, the method can further comprise providing feedback information to a user display device via the controller which comprises power consumption and cost saving options calculated by the controller based on data variables stored in a dynamic table of the memory.

In one embodiment, the method further comprises storing the data variables of the dynamic table comprising averages of first power levels received and second power levels received while identifying and extracting outliers beyond a standard deviation limit or predetermined threshold, wherein the outliers are determined by a dynamic chart.

In one embodiment, building the chart comprises storing averages of first and second power consumption levels and cycling rates along with standard deviations either side of a mean value as a function of time and based on parameters comprising an amount of shade covering the home network, time of day, indoor temperature, outdoor temperature and instantaneous weather conditions impacting the home network.

The disclosure has been described with reference to the embodiments. Obviously, modifications and alterations will occur to others upon reading and understanding the preceding detailed description. It is intended that the disclosure be construed as including all such modifications and alterations.

What is claimed is:

1. A method for monitoring power consumption of at least one energy consuming device with a plurality of components within a home network comprising a power meter for measuring total power consumed by the network including power consumed by at least one of the plurality of components, and a controller communicatively linked to the power meter and the at least one energy consuming device, the controller including at least one memory for storing data and for storing executable instructions, the method comprising:

sending communication commands from the controller to a device controller of the at least one energy consuming device within the home network;

commanding the device controller of the at least one energy consuming device to operate the at least one energy consuming device in a first operational mode and a second different operational mode by the communication commands sent, wherein commanding the device controller includes powering up or down at least one of the plurality of components of the at least one energy consuming device in at least one of the first operational mode and the second operational mode;

recording a first power level of at least one of the plurality of components of the at least one energy consuming device by the power meter during the first operational mode and recording a second power level of at least one of the plurality of components of the at least one energy consuming device by the power meter during the second operational mode; and determining, from at least the first and second recorded power levels, a power consumption profile for the at least one energy consuming device and for the at least one of the plurality of components affecting power consumption of the at least one energy consuming device;

wherein (i) the consumption profile comprises a difference of averages of first power levels received and second power levels received without accounting for outliers of a predetermined threshold; or (ii) the step of determining a consumption profile includes accounting for outliers by developing a chart of running averages and standard deviations either side of a mean value of first and second power levels for the at least one energy consuming device as a function of time and based on parameters comprising at least one of (a) indoor temperature, (b) outdoor temperature, (c) a period of time after the start of an operating cycle, (d) time of day, (e) previous cycle lengths, and (f) power consumption in real time, and identifying outliers beyond standard deviation limits and extracting those points.

2. The method of claim 1, wherein the first operational mode comprises a different power consumption than the second different operational mode.

3. The method of claim 1, wherein the first operational mode comprises a complete powering of the device with all components powered on and the second operational mode comprises a minimal power consumption of the device with all components of the device powered inactive except a master control board.

4. The method of claim 1, further comprising comparing the energy consumption profile of a first home with the energy consumption profile of a second home.

5. The method of claim 1, wherein the first operational mode comprises at least one component of the energy consuming device powering on while maintaining at least one different component of the energy consuming device off, or at least one component of the energy consuming device powering off while maintaining at least one different component of the energy consuming device on.

6. A method for monitoring power consumption of a particular one energy consuming device of a plurality of energy consuming devices within a home network comprising an energy management system comprising a controller with at least one memory storing executable instructions for the method, and a power/energy measuring device for measuring the total power consumed by the particular one energy consuming device, the method executed via the controller comprising:

sending a first communication command via the controller to a device controller of the particular one energy consuming device within the home network;

commanding the device controller of the particular one energy consuming device to communicate with a particular one component of a plurality of components of the particular one energy consuming device to power on via the first communication command sent while concurrently maintaining different components of the particular one energy consuming device without power, or commanding the device controller of the particular one energy consuming device to communicate with the particular one component to power off via the first communication command sent while concurrently maintaining different components of the particular one energy consuming device with power;

recording a first power level of a power/energy measuring device in the at least one memory of the particular one energy consuming device and at least one component of the plurality of components of the particular one energy consuming device;

sending a second different communication command via the controller to the device controller of the particular one energy consuming device within the home network;

commanding the device controller of the particular one energy consuming device to communicate with the particular one component to power off via the second different communication command sent while concurrently maintaining different components of the particular one energy consuming device without power, or commanding the device controller of the particular one energy consuming device to communicate with the particular one component to power on via the second different communication command sent while concurrently maintaining different components of the particular one energy consuming device with power;

recording a second power level of the power/energy measuring device in the at least one memory of the particular one energy consuming device and at least one component of the plurality of components of the particular one energy consuming device; and determining, from at least the first and second recorded power levels, a power consumption profile of the particular one energy consuming device including the power consumption profile of at least one component of the plurality of components.

7. The method of claim 6, wherein the first and second different communication commands comprise wireless radio frequency signals transmitted wirelessly, and wherein the device controller powers on the particular one component via a processor of the device controller without a breaker or a transducer and obtains the first and second power levels from the power/energy measuring device by a wireless radio frequency transmission, the power/energy measuring device comprising a smart utility meter that is wirelessly coupled to the controller.

8. The method of claim 6, further comprising: providing feedback information to a user display device via the controller which comprises power consumption and cost saving options calculated by the controller based on data variables stored in a dynamic table of the at least one memory.

9. The method of claim 6, wherein determining the power consumption profile comprises determining a difference of power consumption levels in a predetermined time interval and selecting a power consumption level when a specified minimal change occurs within the predetermined time interval to be stored as an average power consumption level.

10. The method of claim 6, wherein determining the power consumption profile comprises:

determining a time interval between recording the first power level and the second power level as a first cycle;

recording a third power level at a first time that is after a start period of the time interval of a second cycle;

recording a fourth power level at a midpoint time of the second cycle;

recording a fifth power level at a period after the midpoint time of the second cycle; and averaging the third power level, the fourth power level and the fifth power level to determine an average power consumption level.

11. The method of claim 6, wherein determining the power consumption profile comprises:

determining a time interval between recording the first power level and the second power level as a first cycle;

curvefitting an exponential curve using a third power level that is after a start period of the time interval of a second cycle, a fourth power level recorded at a midpoint time of the second cycle, and a fifth power level at a time after the midpoint time, and integrating an area under the curve divided by a time elapsed as an average integrated load.

12. The method of claim 6, wherein determining the power consumption profile comprises:

determining a time interval between recording the first power level and the second power level as a first cycle;

determining an approximate midpoint time of the first cycle and recording a third power consumption level at a midpoint of a second cycle as an average power consumption.

* * * * *

UNITED STATES PATENT AND TRADEMARK OFFICE
CERTIFICATE OF CORRECTION

| | | |
|---|---|---|
| PATENT NO. | : 8,606,419 B2 | Page 1 of 1 |
| APPLICATION NO. | : 12/781191 | |
| DATED | : December 10, 2013 | |
| INVENTOR(S) | : Besore et al. | |

It is certified that error appears in the above-identified patent and that said Letters Patent is hereby corrected as shown below:

In the Specification

In Column 7, Line 37, delete "arcading" and insert -- are reading --, therefor.

Signed and Sealed this
Eighth Day of April, 2014

Michelle K. Lee
*Deputy Director of the United States Patent and Trademark Office*